Figure 1:
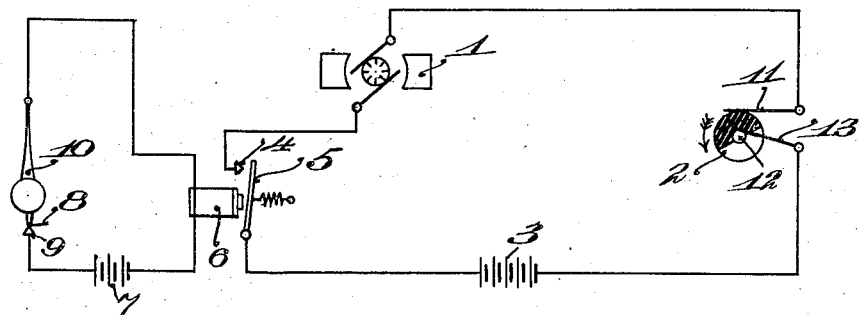

No. 870,505. PATENTED NOV. 5, 1907.
W. P. GERRISH.
APPARATUS FOR SYNCHRONIZING MOTORS.
APPLICATION FILED JAN. 23, 1905.

2 SHEETS—SHEET 1.

Witnesses
Edward S. Day
Farnum F. Dorsey

Inventor
Willard P. Gerrish
by his Attorneys
Phillips Van Everen & Fish

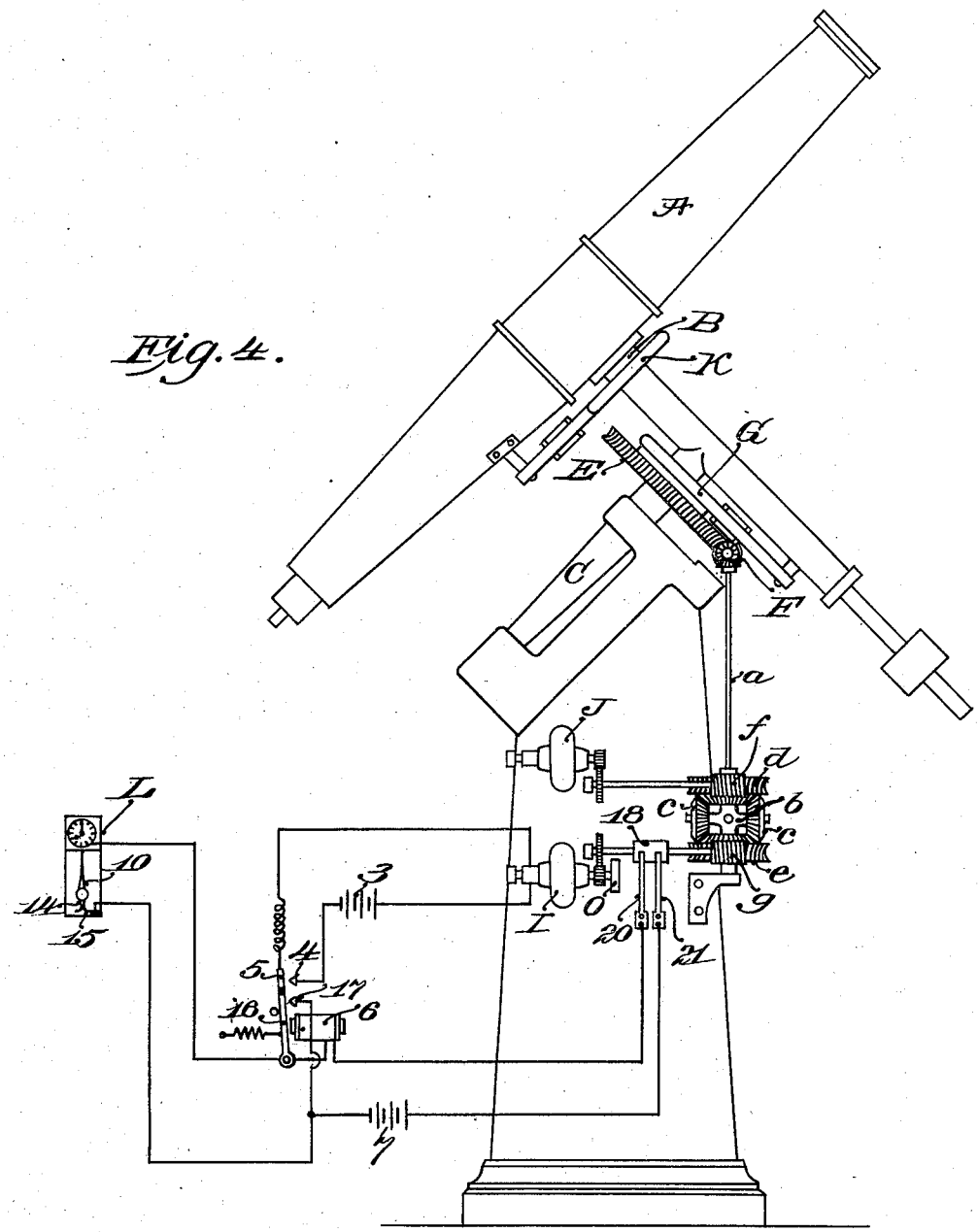

UNITED STATES PATENT OFFICE.

WILLARD P. GERRISH, OF CAMBRIDGE, MASSACHUSETTS, ASSIGNOR OF ONE-HALF TO THE ALVAN CLARK AND SONS CORPORATION, OF CAMBRIDGE, MASSACHUSETTS, A CORPORATION OF NEW JERSEY.

APPARATUS FOR SYNCHRONIZING MOTORS.

No. 870,505.   Specification of Letters Patent.   Patented Nov. 5, 1907.

Application filed January 23, 1905. Serial No. 242,272.

*To all whom it may concern:*

Be it known that I, WILLARD P. GERRISH, a citizen of the United States, residing at Cambridge, in the county of Middlesex and State of Massachusetts, have invented certain new and useful Improvements in Apparatus for Synchronizing Motors; and I do hereby declare the following to be a full, clear, and exact description of the invention, such as will enable others skilled in the art to which it appertains to make and use the same.

The present invention relates to an improved apparatus for synchronizing motors.

The invention is intended primarily for use in connection with the driving mechanism of telescopes or other astronomical instruments, but is also capable of use in connection with any mechanism or devices to which it is desired to impart a synchronous motion.

The present invention is an improvement on a synchronizing apparatus devised by the present applicant and disclosed by him to the public without applying for the grant of a patent therefor, and in order that the novel features of the present invention may be more clearly understood this apparatus is illustrated and described in this application.

The apparatus on which the present invention is an improvement utilizes an electric circuit to control the speed of the motor, said circuit when in one condition acting to accelerate, and when in another condition acting to retard the speed of the motor. The apparatus is applied to an electric motor and the power circuit of the motor is used as the speed controlling circuit. Means are provided for closing the power circuit of the motor at regular intervals and for breaking said circuit by the action of the motor after each closure, these means consisting of a relay the contacts of which are included in the motor circuit, a circuit breaking and closing device in the form of a commutator driven by the motor also included in the motor circuit, and a clock pendulum for closing and opening the circuit of the relay at regular intervals. This apparatus, as will hereinafter appear, necessitates the use of contact devices operated by the pendulum, which will keep the circuit of the relay closed during one half of a complete oscillation of the pendulum, and also necessitates the use of a commutator or circuit-breaking device which will keep the circuit of the motor open during one-half of the time occupied by a complete oscillation of the pendulum. The maximum length of the electrical impulses which can be transmitted to the motor is equal to one-half of the period of oscillation of the pendulum, and these impulses can vary from this maximum to zero as a minimum. Under the most favorable conditions, therefore, current is supplied to the motor but one-half of the time, so that in any case but one-half of the power which the motor is capable of developing can be used. Also, on account of the length of time during which the circuit of the motor is kept open the speed of the motor varies to an appreciable extent. The limited range of the variations in the duration of the electrical impulses and the length of time during which the power circuit of the motor is necessarily kept open also limits the capacity of the apparatus to restore synchronism in case the motor or the controlled shaft driven thereby falls behind on account of an obstruction or loss of motive power.

The objects of the present invention are to overcome these objectionable features and at the same time provide an apparatus which is simpler in construction and arrangement and more efficient in operation.

The defects in the operation of the apparatus above referred to are due primarily to the fact that the speed controlling circuit, after having been placed in a speed retarding condition by the action of the motor during each interval, is prevented from being changed to a speed accelerating condition during at least one-half of the interval.

The present invention contemplates the provision of means for retaining the speed controlling circuit in the condition in which it is placed by the action of the motor during the remainder of the interval while at the same time permitting a change to the other condition. The provision of these means, as will appear from the description of the illustrated embodiments of the invention, permits the apparatus to be so arranged that the duration of the speed accelerating condition of the circuit can vary from practically an entire interval as a maximum to zero as a minimum, and the duration of the speed retarding condition of the circuit can vary between the same limits. Under normal conditions the speed controlling circuit can be in a speed retarding condition for a comparatively short time during each interval, and thereby the fluctuations in the speed of the motor decreased so as to be practically inappreciable, and at the same time practically the entire power which the motor is capable of developing can be used. The wide variations in the duration of the two conditions of the speed controlling circuit also increases the capacity of the apparatus to restore synchronism in case the controlled shaft falls behind on account of a loss of power or from any other cause.

Another and important advantage secured by the present invention is that the change which is made in the speed controlling circuit at regular intervals can be produced by a momentary signal such for instance as the make or break in an electric circuit commonly produced by an astronomical clock or chronometer.

The invention, broadly considered, contemplates retaining the speed controlling circuit in the condition in which it is placed by the action of the motor during each interval in any suitable manner which permits its change to the other condition. It is preferred, however, to retain the circuit in this condition independently of the action of the motor, as devices for accomplishing this result can be simple in construction and arrangement and efficient in operation.

Broadly considered, the present invention contemplates the use of any suitable form of apparatus acting in the manner above set forth. The apparatus hereinafter described, however, embodies the invention in the best forms which have at present been devised, and these apparatus, in addition to embodying the broad principle of the invention also embody certain novel features of construction and arrangement hereinafter described and claimed, the advantages of which will be obvious from the following description.

Figure 2:
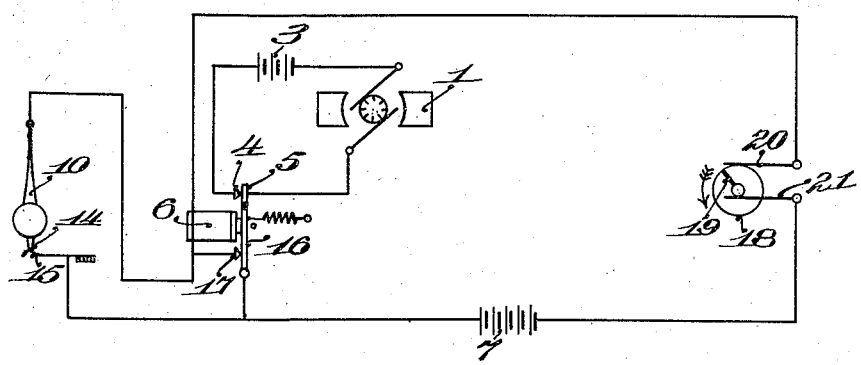
Figure 3:
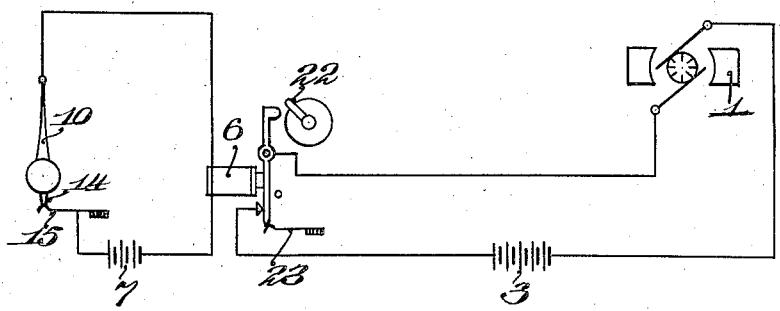

The present invention will be clearly understood from an inspection of the accompanying drawings, in which Figure 1 is a diagrammatic view illustrating the arrangement of the apparatus above referred to, which has heretofore been used in synchronizing an electric motor; Fig. 2 is a diagrammatic view illustrating an apparatus for synchronizing an electric motor which embodies the present invention in its preferred form; Fig. 3 is a diagrammatic view illustrating a modified form of apparatus embodying the present invention; and Fig. 4 is a view illustrating the application of the apparatus shown in Fig. 2 to the driving mechanism of a telescope.

In the apparatus illustrated in Fig. 1, 1 indicates an electric motor, and 2 a circuit opening and closing device in the form of a commutator included in the power circuit of the motor and driven through suitable gearing from the armature of the motor.

3 indicates a generator for supplying current to the motor, and 4 and 5 indicate the contacts of a relay, which are also included in the power circuit. The power circuit of the motor can thus be broken at either the contacts 4 and 5 or at the commutator 2.

The relay is indicated at 6 and is included in a relay circuit in which is also included a battery 7 or other source of current and contacts 8 and 9. The contact 8 is carried upon a pendulum 10 and is arranged to engage the contact 9 during one-half of its period of oscillation.

The circuit breaking and closing device 2 consists of a cylinder upon the periphery of which bears a brush 11 connected to the motor circuit. One-half of the periphery of the cylinder is composed of insulating material, and the other half of conducting material, the conducting material being in electrical connection with the shaft 12 of the cylinder upon which bears the brush 13 also connected to the motor circuit. The circuit of the relay 6 is thus closed during one-half of the period of oscillation of the pendulum, and the motor circuit is closed at the commutator 2 during one-half of the revolution of the commutator.

Supposing the brush 11 to be on the conducting portion of the commutator when the contact 8 engages the contact 9, the motor circuit is closed, by the energizing of the relay, at the contacts 4 and 5. The motor being supplied with current, the commutator 2 is revolved, and the circuit of the motor remains closed until it is broken by the insulating portion of the commutator passing beneath the brush 11. After the motor circuit is broken at the commutator the relay circuit is broken by the separation of the contact 8 from the contact 9. The motor continues to rotate on account of its momentum after its circuit is broken, but at a gradually decreasing speed. The brush 11 passes onto the contacting portion of the commutator before the contact 8 reëngages the contact 9, so that as soon as the relay circuit is again closed at the contacts 8 and 9 the motor circuit is again closed at the contacts 4 and 5. While the circuit of the motor is closed, the speed of the motor gradually increases. If the commutator 2 makes a complete rotation during the period of oscillation of the pendulum, the current impulses transmitted to the motor are of uniform duration. In case the speed of the commutator increases, the duration of the current impulses transmitted to the motor decreases, and in case the speed of the commutator decreases the length of the current impulses transmitted to the motor increases. The speed of the motor is thus accelerated or retarded until the commutator makes one complete rotation during the period of oscillation of the pendulum.

In the operation of the apparatus illustrated in Fig. 1, it will be seen that the duration of the current impulses transmitted to the motor can never exceed one-half of the period of oscillation of the pendulum, so that when the motor is running under the most advantageous conditions, but one-half of the power which the motor is capable of developing is used. When running under normal conditions, the duration of the current impulses is considerably less than one-half of the period of oscillation of the pendulum, this mode of operation being necessary in order that the duration of the impulses may be increased when the speed of the motor decreases. The duration of the current impulses may be decreased to zero as a minimum, but can only be increased to one-half of the period of oscillation as a maximum.

Referring now to Fig. 2, which illustrates an apparatus embodying the preferred form of the present invention, 1 indicates the electric motor, 3 the generator which supplies current for the motor, and 4 and 5 the relay contacts, these parts being arranged as in the apparatus illustrated in Fig. 1. 6 indicates the relay as in Fig. 1, which is supplied with current from the battery 7 or other generator. The relay circuit includes contacts 14 and 15, one of which is carried by the pendulum 10. These contacts, however, instead of being arranged to remain in engagement during one-half of the period of oscillation of the pendulum, are arranged to momentarily engage during the swing of the pendulum in each direction. The engagement of these contacts energizes the relay 6 and causes its armature 16 to be attracted, and closes the power circuit of the motor at the contacts 4 and 5. When the armature 16 of the relay is attracted, a shunt across the contacts 14 and 15 is closed by the engagement of the armature 16 with the contact 17, so that the relay remains energized after the separation of the contacts 14 and 15. At 18 a circuit opening and closing device is provided which is driven from the armature of the motor 1, but this circuit opening and closing device instead of being included in the motor circuit, as in the apparatus illustrated in Fig. 1, is included in the relay circuit. As illustrated, the circuit opening and closing device is in the form of a commutator and consists of a cylinder of conducting material provided with a narrow strip of insulating material indicated at 19. Brushes 20 and 21 connected to the relay circuit bear respectively upon the periphery and the shaft of the commutator. During each revolution of the commutator 18, therefore, the relay circuit is broken at the commutator and immediately again closed at this point, so that the relay circuit can be closed as soon as the contact 14 engages the contact 15. The momentary break in the relay circuit at the commutator 18 deënergizes the relay 6 so that the relay armature is retracted by its retracting spring and the motor circuit is broken. The retraction of the relay armature also breaks the shunt across the contacts 14 and 15, so that the relay armature remains in its retracted position and the motor circuit remains open until it is again closed by the engagement of the contacts 14 and 15.

Under normal conditions the commutator 18 makes one complete revolution during the interval between successive closures of the motor circuit and the current impulses transmitted to the motor are of uniform duration. If the speed of the motor increases, the duration of the current impulses decreases, and if the speed of the motor decreases, the duration of the current impulses increases, so that the speed of the motor is accelerated or retarded until the commutator 18 rotates at its normal speed. This mode of operation will be obvious without further description. It will be noted that the duration of the current impulses may be decreased to zero as a minimum as in the apparatus illustrated in Fig. 1, but that the duration of the current impulses can be increased to substantially the entire interval between successive closures of the motor circuit as a maximum instead of to one-half of this interval as in the apparatus illustrated in Fig. 1. Since the duration of the current impulses transmitted to the motor can be increased so as to be practically equal to the entire period between successive closures of the motor circuit, the duration of the current impulses under normal conditions can be a substantial part of the period between successive closures of the motor circuit so that a much greater portion of the power which the motor is capable of developing can be utilized than with the apparatus which has heretofore been employed. Under normal conditions the motor is deprived of current during much shorter intervals than with the apparatus heretofore used, so that the fluctuations in the speed of the motor are decreased to a marked degree, and in actual practice are inappreciable. In actual practice the wide variation which can be made in the duration of the electrical impulses enables the apparatus to restore synchronism until the commutator falls behind from a half to three-quarters of a revolution while in the apparatus illustrated in Fig. 1 synchronism cannot be restored if the commutator falls behind a quarter of a revolution. In the apparatus illustrated in Fig. 2 a lag of one-half to three-quarters of a revolution is necessary to cause the commutator to permanently lose one complete revolution, while in the apparatus illustrated in Fig. 1 the permanent loss of one complete revolution will result as soon as the commutator lags a quarter of a revolution.

The fundamental difference between the apparatus illustrated in Figs. 1 and 2 resides in the manner in which the motor circuit is retained in its open condition after being broken by the action of the motor, the motor circuit in the apparatus illustrated in Fig. 1 being retained in its open condition by the commutator during one-half of the interval between successive closures, while in the apparatus illustrated in Fig. 2 the commutator merely acts to cause the motor circuit to be broken, and thereafter has no control over the motor circuit, which is kept open at the relay contacts until closed by the energizing of the relay. On account of this difference in the manner in which the motor circuit is retained in its open or speed retarding condition an increase in the length of the current impulses transmitted to the motor is made possible. This difference also permits the use of a momentarily acting circuit closing and breaking device to control the closing of the motor circuit at regular intervals so that the closing of the circuit can be controlled by a momentary signal such as is ordinarily given by an astronomical clock or chronometer.

In Fig. 3 an apparatus embodying the present invention is illustrated, in which the motor circuit is broken by means of a mechanical device operated by the motor. The mechanical device consists of an arm 22 secured to a shaft which is rotated from the motor armature. This arm at a certain point in the rotation of the shaft is arranged to engage the armature lever of the relay and move the lever to separate the relay contacts, the continued rotation of the shaft moving the arm 22 out of engagement with the armature lever and leaving the armature in condition to be attracted when the relay is energized. The motor circuit, the relay contacts, the relay and the contacts for momentarily closing the circuit of the relay, are arranged as in the apparatus illustrated in Fig. 2 with the exception that no provision is made for shunting the contacts in the relay circuit when the armature of the relay is attracted. In order to retain the relay armature in either its attracted or retracted position, a stop spring 23 is provided which is arranged to bear against the end of the armature lever.

In both of the apparatus illustrated in Figs. 2 and 3, the motor circuit is maintained in its open position independently of the action of the motor, and this method of maintaining the motor circuit open is preferred as it enables the invention to be embodied in an apparatus comprising a comparatively few parts arranged in a simple manner. It is to be understood, however, that other methods of maintaining the motor circuit open in a condition to be closed are within the scope of the invention.

The present invention is intended primarily for use in connection with the driving mechanism of telescopes or other astronomical instruments, and in Fig. 4 the apparatus illustrated in Fig. 2 is shown as applied to the driving mechanism of a telescope. Referring to this figure, A indicates a telescope mounted on a declination axis B, which in turn is mounted on a polar axis C. The axis C is rotated by a worm gear E which meshes with a worm F driven through bevel gears from a vertical shaft $a$. The worm gear E is loose on the polar axis C and is secured to the sleeve carrying the declination axis B by means of a suitable clamp G, the object of this construction being to allow the telescope to be turned about the polar axis independently of its driving mechanism. A similar clamp K connects the telescope with the axis B. The shaft $a$ is driven through a differential gearing comprising a spider $b$, to which the shaft $a$ is secured, and which carries bevel gears $c$. These bevel gears mesh with bevel gears formed upon the adjacent faces of worm gears $d$ and $e$ loosely mounted upon the shaft $a$. Worms $f$ and $g$ mesh with the worm gears $d$ and $e$ and are driven from electric motors I and J. The motor I is used to drive the telescope synchronously with a clock mechanism which is indicated at L, the motor J being normally idle so that the worm F holds the worm gear $d$ of the differential gearing stationary. The provision of the differential gearing and the motor J is for the purpose of enabling the telescope to be adjusted while it is being driven by the motor I.

The synchronizing apparatus is indicated diagrammatically in substantially the same manner as in Fig. 2 and will be readily understood without further description. The brushes 20 and 21 which are included in the relay circuit both bear upon the periphery of the commutator 18 so that the relay of the circuit is broken whenever the insulating strip in the periphery of the commutator passes beneath the brushes. The commutator is mounted upon the shaft of the worm $g$ and this shaft is geared to the armature of the motor. A fly wheel O is provided, which is driven by the motor and by its momentum aids in preventing fluctuations in the speed of the motor.

The mechanism for driving the telescope forms no part of the present invention, and it has therefore been considered unnecessary to illustrate and describe this mechanism in detail.

In the illustrated embodiments of the invention above described, the power circuit of an electric motor is utilized as a speed controlling circuit, said circuit when in one condition acting to accelerate and when in another condition acting to retard the speed of the motor. The present invention broadly considered, however, is not limited to the use of the power circuit of an electric motor as the speed controlling circuit, but contemplates the use of any suitable electric circuit arranged to control the acceleration and retardation of a motor whether said motor is driven by electricity or any other form of energy. In its broader aspects also the invention is not limited to an apparatus in which the change which is made in the condition of the speed controlling circuit at regular intervals is produced by breaking the circuit nor to an apparatus in which the change at regular intervals is to a speed accelerating condition. When the invention is applied to an electric motor in the manner illustrated in the drawings it is to be understood that the motor can be controlled by producing a substantial variation in the amount of current which is supplied thereto, and any means by which this result is accomplished is considered to be within the scope of the invention and to be the equivalent of the means above described for making and breaking the power circuit. It is also to be understood that it is not necessary that the makes and breaks occur in a circuit through which the entire current for energizing the motor is transmitted.

The nature and scope of the present invention having been indicated and the preferred manner in which the invention may be practiced having been specifically described, what is claimed is:—

1. An apparatus for synchronizing a motor, having, in combination, a speed controlling electric circuit adapted to be changed from a condition in which the speed of the motor is accelerated to a condition in which the speed of the motor is retarded, means for placing the circuit in one of said conditions at regular intervals, means controlled by the motor for restoring the circuit to the other condition during each interval, and means for retaining the circuit in said last mentioned condition during the remainder of the interval while permitting a change to the other condition.

2. An apparatus for synchronizing a motor, having, in combination, a speed controlling electric circuit adapted to be changed from a condition in which the speed of the motor is accelerated to a condition in which the speed of the motor is retarded, means for placing the circuit in one of said conditions at regular intervals, means controlled by the motor for restoring the circuit to the other condition during each interval, and means independent of the motor for retaining the circuit in said last mentioned condition during the remainder of the interval.

3. An apparatus for synchronizing a motor, having, in combination, a speed controlling electric circuit adapted to be changed from a condition in which the speed of the motor is accelerated to a condition in which the speed of the motor is retarded, means acting momentarily at regular intervals to place the circuit in one of said conditions, means for retaining the circuit in said condition, and means controlled by the motor for restoring the circuit to the other condition during each interval.

4. An apparatus for synchronizing a motor, having, in combination, a speed controlling electric circuit, means acting at regular intervals to change the circuit from a condition in which the speed of the motor is retarded to a condition in which the speed of the motor is accelerated, means controlled by the motor for restoring the circuit during each interval to a condition in which the speed of the motor is retarded, and means independent of the motor for retaining the circuit in said last mentioned condition during the remainder of the interval.

5. An apparatus for synchronizing a motor, having, in combination, a speed controlling electric circuit, means acting at regular intervals to change the circuit from a condition in which the speed of the motor is retarded to a condition in which the speed of the motor is accelerated, means controlled by the motor for restoring the circuit during each interval to a condition in which the speed of the motor is retarded, and means for retaining the circuit in said last mentioned condition during the remainder of the interval while permitting a change to a condition in which the speed of the motor is accelerated.

6. An apparatus for synchronizing a motor, having, in combination, a speed controlling electric circuit, a relay the contacts of which are included in said circuit, means for energizing the relay at regular intervals to change said circuit from a condition in which the speed of the motor is retarded to a condition in which the speed of the motor is accelerated, and means controlled by the motor for actuating the relay contacts during each interval to restore the circuit to a condition in which the speed of the motor is retarded.

7. An apparatus for synchronizing a motor, having, in combination, a speed controlling electric circuit, a relay the contacts of which are included in the motor circuit, means acting momentarily at regular intervals for energizing the relay to change said circuit from a condition in which the speed of the motor is retarded to a condition in which the speed of the motor is accelerated, means for retaining the circuit in said last mentioned condition, and means controlled by the motor for actuating the relay contacts during each interval to restore the circuit to a condition in which the speed of the motor is retarded.

8. An apparatus for synchronizing a motor, having, in combination, a speed controlling electric circuit, means acting momentarily at regular intervals to change the circuit from a condition in which the speed of the motor is retarded to a condition in which the speed of the motor is accelerated, means for retaining the circuit in said last mentioned condition, and means controlled by the motor for restoring the circuit during each interval to a condition in which the speed of the motor is retarded.

9. An apparatus for synchronizing an electric motor, having, in combination, means for closing the power circuit of the motor at regular intervals, means controlled by the motor for breaking said circuit after each closure, and means for maintaining said circuit open after each break while permitting a closure of the circuit.

10. An apparatus for synchronizing an electric motor, having, in combination, means for closing the power circuit of the motor at regular intervals, means controlled by the motor for breaking said circuit after each closure, and means independent of the motor for maintaining said circuit open after each break.

11. An apparatus for synchronizing an electric motor, having, in combination, a relay the contacts of which are included in the motor circuit, means for energizing the relay at regular intervals to close the motor circuit at the relay contacts, and means controlled by the motor for opening the motor circuit at the relay contacts after each closure.

12. An apparatus for synchronizing an electric motor, having, in combination, a relay the contacts of which are included in the motor circuit, means for momentarily closing the circuit of the relay at regular intervals to close the motor circuit at the relay contacts, means for maintaining the motor circuit closed at the relay contacts until broken by the action of the motor, and means controlled by the motor for opening the motor circuit at the relay contacts after each closure.

13. An apparatus for synchronizing an electric motor, having, in combination, means acting momentarily at regular intervals to close the power circuit of the motor, means for retaining said circuit closed until broken by the action of the motor, and means for breaking said circuit by the action of the motor after each closure.

In testimony whereof I affix my signature, in presence of two witnesses.

WILLARD P. GERRISH.

Witnesses:
  FRED O. FISH,
  FARNUM F. DORSEY.